United States Patent [19]

Suga et al.

[11] Patent Number: 5,267,136
[45] Date of Patent: Nov. 30, 1993

[54] DC-DC CONVERTER HAVING PARALLEL CONVERTER CIRCUITS

[75] Inventors: Ikuro Suga; Masato Koyama, both of Amagasaki, Japan

[73] Assignee: Mitsubishi Denki Kabushiki Kaisha

[21] Appl. No.: 790,270

[22] Filed: Nov. 12, 1991

[30] Foreign Application Priority Data

Nov. 14, 1990 [JP] Japan .................................. 2-308013
Jul. 26, 1991 [JP] Japan .................................. 3-208840

[51] Int. Cl.⁵ .......................................... H02M 3/335
[52] U.S. Cl. .......................................... 363/65; 307/6;
307/75; 307/82; 323/271; 363/21
[58] Field of Search ..................... 307/74, 75, 82, 5, 6;
323/268, 269, 270, 271, 272; 363/20, 21, 59, 60,
62, 65, 71

[56] References Cited

U.S. PATENT DOCUMENTS

| | | | |
|---|---|---|---|
| 4,317,039 | 2/1982 | Romandi | 378/105 |
| 4,320,305 | 3/1982 | Thomas | 307/6 |
| 4,611,162 | 9/1986 | Erratico et al. | 307/75 |
| 5,029,064 | 7/1991 | Ball | 363/71 |
| 5,105,351 | 4/1992 | Harada et al. | 363/65 |

OTHER PUBLICATIONS

"Switching Amplifier for Portable Telephone," IEICE Technical Report vol. 89, No. 314 (Nov. 1989).
"Handbook for Practical Power Supply Circuit Device," p. 51, (Dec. 1988).
"Introduction to Power Electronics," p. 177, (Dec. 1984).
"Advances in Switched-Mode Power Conversion," IEEE Transaction on Industrial Electronics, vol. IE-30, No. 1, (Feb. 1983).

Primary Examiner—Jeffrey Sterrett
Attorney, Agent, or Firm—Rothwell, Figg, Ernst & Kurz

[57] ABSTRACT

A DC-DC converter for outputting dc voltage whose peak value is higher than an input dc voltage value and high-frequency voltage corresponding to a command value is superimposed. An insulated switching power supply 27 and a series regulator 26 are connected in parallel to a dc power supply 1. The insulated switching power supply 27 generates output voltage $V_2$ having a certain level, and the series regulator 26, output voltage $V_1$ whose voltage varies depending on a command value (command voltage varying at a high frequency). Then, the sum of the output voltages $V_1$ and $V_2$ is fed to the load 9.

8 Claims, 17 Drawing Sheets

DC-DC CONVERTER HAVING PARALLEL CONVERTER CIRCUITS

BACKGROUND OF THE INVENTION

1. Field of the Invention

The present invention relates to a DC-DC converter capable of varying output voltage.

2. Description of the Related Art

FIG. 15 is a circuit diagram showing a series regulator or a DC-DC converter of prior art disclosed in page 51 of the Practical Power Circuit Design Handbook (published by CQ Publishing Co., Ltd. in May of 1988). In FIG. 15, 1 denotes a dc power supply for supplying input voltage, and 2, a transistor which is connected to the positive terminal of the dc power supply 1 for converting voltage. 3 is a high-potential output terminal of converted voltage, which is connected to the emitter of the transistor 2. 4 denotes a low-potential output terminal, which is connected to the negative terminal of the dc power supply 1.

5 and 6 are resistors for detecting output voltage, which are connected in series between the output terminals 3 and 4. 7 denotes a command power supply containing command voltage. 8 is a differential amplifier which compares the divided value of output voltage developed at the junction of the registers 5 and 6 with the command voltage fed from the command power supply 7, and thereby controls base current of the transistor 2. 9 is a load connected between the output terminals 3 and 4.

The operations of the foregoing DC-DC converter of prior art are explained below.

Output voltage between output terminals 3 and 4 is divided and detected by resistors 5 and 6. The detected voltage is inputted to a differential amplifier 8. The differential amplifier 8 compares the detected voltage with the command voltage fed from a command power supply 7, then amplifies the difference between the voltages to control base current of a transistor 2. The collector-to-emitter voltage of the transistor 2 varies depending on the base current. Thus, the transistor 2 can control output voltage. In this case, it is impossible to make an output voltage higher than an input voltage fed from a dc power supply 1. However, input voltage can be varied in response to considerably high-frequencies. (Thus, the DC-DC converter can act on rapid variations in command voltage).

FIG. 16 shows another DC-DC converter of the prior art. The circuit diagram shows a switching power supply based on a forward converter. In FIG. 16, 1 denotes a dc power supply, and 9, a load. 10 and 11 are high-potential and low-potential output terminals, respectively, to which the load 9 is connected.

12 and 13 are resistors for detecting output voltage connected in series between the output terminals 10 and 11. 14 denotes a command power supply containing command voltage. 15 is a differential amplifier for comparing the divided value of output voltage developed at the junction of the resistors 12 and 13 with the command voltage fed from the command power supply 14. 16 is a photocoupler for electrically insulating the output of the differential amplifier 15.

17 denotes a pulse width control circuit connected to the output of the photocoupler 16, and 18, a switching element whose on and off operations are controlled according to the output of the pulse width control circuit 17. 19 is a transformer having a primary winding 19a, a secondary winding 19b, and a reset winding 19c connected in series with the primary winding 19a. The junction of the primary winding 19a and reset winding 19c is connected to the positive terminal of the dc power supply 1. The other side of the primary winding 19a is connected to the output of the switching element 18, and one side of the secondary winding 19b, to the low-potential output terminal 11. 20 denotes a diode whose anode is connected to the negative terminal of the dc power supply 1 and cathode is connected to the reset winding 19c of the transformer 19.

21 and 22 are diodes, wherein the cathodes are connected to a common node and the anodes are connected to the sides of the secondary winding 19b of the transformer 19. 23 denotes a choke coil connected between the cathodes of the diodes 21 and 22, and the high-potential output terminal 10. 24 denotes a smoothing capacitor connected between the high-potential output terminal 10 and the low-potential output terminal 11.

The operations of the foregoing DC-DC converter of prior art are explained below.

Intermittent energy fed from a dc power supply 1 by the switching operation of a switching element 18 is rectified by diodes 21 and 22 connected to a secondary winding 19b of a transformer 19. Then, the energy is smoothed by a choke coil 23 and a smoothing capacitor 24, then provided as a DC output between output terminals 10 and 11.

At this time, energy transfer to the secondary winding 19b of the transformer 19 is done with the switching element 18 on. A reset winding 19c of the transformer 19 is designed to restore energy stored in the transformer 19 with the switching element 18 on to the dc power supply 1 via a reset diode 20 with the switching element 18 off.

On the other hand, output voltage is controlled as follows; that is, the difference between the voltage divided and detected by resistors 12 and 13 and the command voltage fed from a command power supply 14 is amplified by a differential amplifier 15, then provided to a photocoupler 16. A pulse width control circuit 17 receives the signal via the photocoupler 16, then controls the on and off operations of the switching element 18 at the on/off ratio corresponding to the signal received. Thereby, the input voltage from the dc power supply 1 is stepped up or down according to the command voltage, then provided as output voltage between output terminals 10 and 11.

DC-DC converters of prior art have the aforesaid configuration. Therefore, a series regulator cannot make (step up) an output voltage higher than an input voltage. In addition, it is difficult to extend the range of frequencies at which a switching power supply can vary output voltage because of the restriction of the switching frequency or the cutoff frequency of a filter for smoothing outputs (the switching power supply cannot act on rapid variations in command voltage). Even when a DC-DC converter has a configuration shown in FIG. 17 that a booster-type switching power supply 25 and a series regulator 26 are connected in tandem (in series), the overall power conversion efficiency greatly deteriorates because it is a product of the efficiencies of the booster-type switching power supply 25 and the series regulator 26.

SUMMARY OF THE INVENTION

The principal object of the present invention is to solve the aforesaid problems, or more particularly, to provide a DC-DC converter with excellent power conversion efficiency which can yield a higher output voltage than an input voltage and vary output voltage according to high-frequency variation commands.

In a DC-DC converter according to the present invention, the inputs of a series regulator and an insulated switching power supply are connected in parallel to a dc power supply, and the high-voltage output terminal of the series regulator and the low-voltage output terminal of the switching power supply, or the low-voltage output terminal of the series regulator and the high-voltage output terminal of the switching power supply are connected to use the other output terminals of the series regulator and switching power supply as voltage supply terminals for a load.

In other DC-DC converter according to the invention, the inputs of a series regulator and a switched capacitor circuit are connected in parallel to a dc power supply, and the high-voltage output terminal of the series regulator and the low-voltage output terminal of the switched capacitor circuit, or the low-voltage output terminal of the series regulator and the high-voltage output terminal of the switched capacitor circuit are connected to use the other output terminals of the series regulator and switched capacitor circuit as voltage supply terminals for a load.

In a DC-DC converter according to the invention, a series regulator acts on variation commands for varying output voltage at high frequencies and supplies the sum of the output voltages of the series regulator and an insulated switching power supply. Thereby, the DC-DC converter responds to high-frequency variation commands and supplies a stepped-up voltage of input voltage to a load.

In other DC-DC converter according to the invention, a series regulator acts on variation commands for varying output voltage at high frequencies and supplies the sum of the output voltages of the series regulator and a switched capacitor circuit. Thereby, the DC-DC converter responds to high-frequency variation commands and supplies a stepped-up voltage of input voltage to a load.

DESCRIPTION OF THE PREFERRED EMBODIMENTS

EMBODIMENT 1

Figure 1:
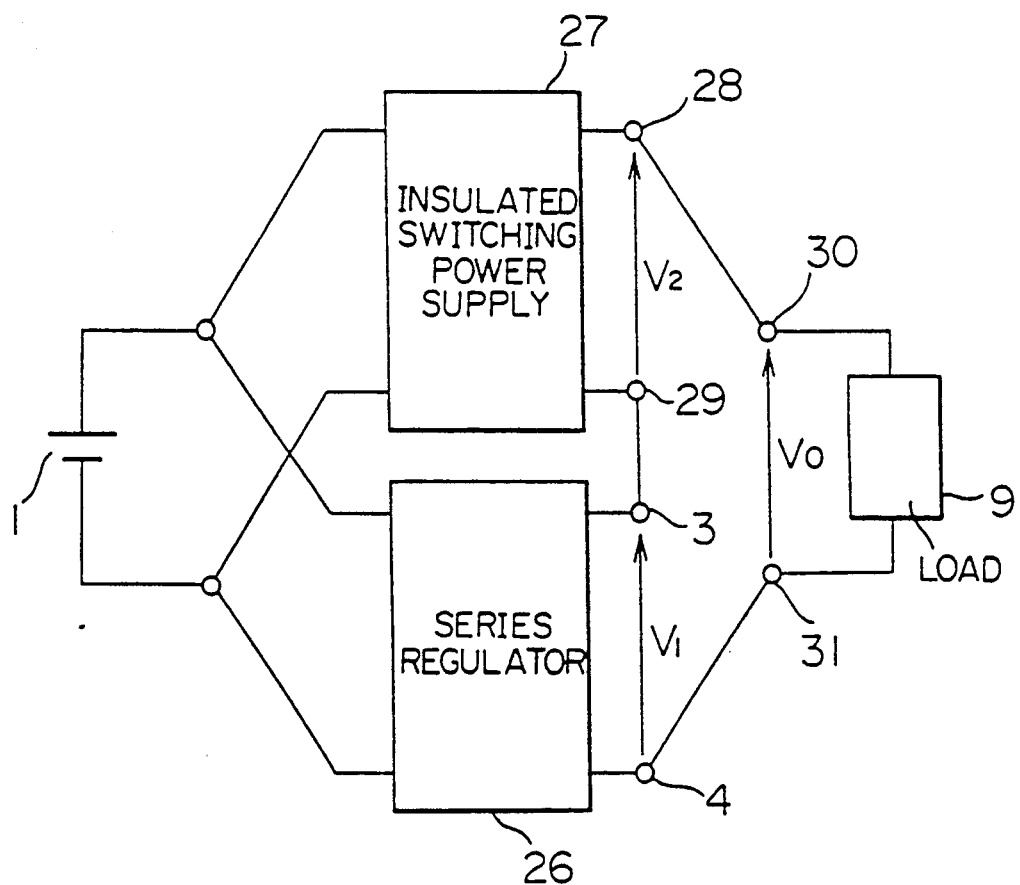
FIG. 1 is a block diagram showing a DC-DC converter according to an embodiment of the present invention.

An embodiment of the present invention is explained in conjunction with drawings. In FIG. 1, 1 denotes a dc power supply, and 9, a load. 26 denotes a series regulator. 3 and 4 are the high-potential and low-potential output terminals of the series regulator 26. 27 denotes an insulated switching power supply, wherein input terminals are connected, in parallel with the series regulator 26, to the dc power supply 1 and the output terminals are connected in series with the output of the series regulator 26 so that the sum of the output voltages of the insulated switching power supply 27 and the series regulator 26 will be supplied. 28 and 29 are the high-potential and low-potential output terminals of the insulated switching power supply 27. In this embodiment, the high-potential output terminal 3 of the series regulator 26 is connected to the low-potential output terminal 29 of the switching power supply 27.

30 and 31 are the high-potential and low-potential output terminals (voltage supply terminals) of the DC-DC converter to which the load 9 is connected. The high-potential output terminal 30 is connected to the high-potential output terminal 28 of the switching power supply 27, and the low-potential output terminal 31, to the low-potential output terminal 4 of the series regulator 26.

Figure 2:
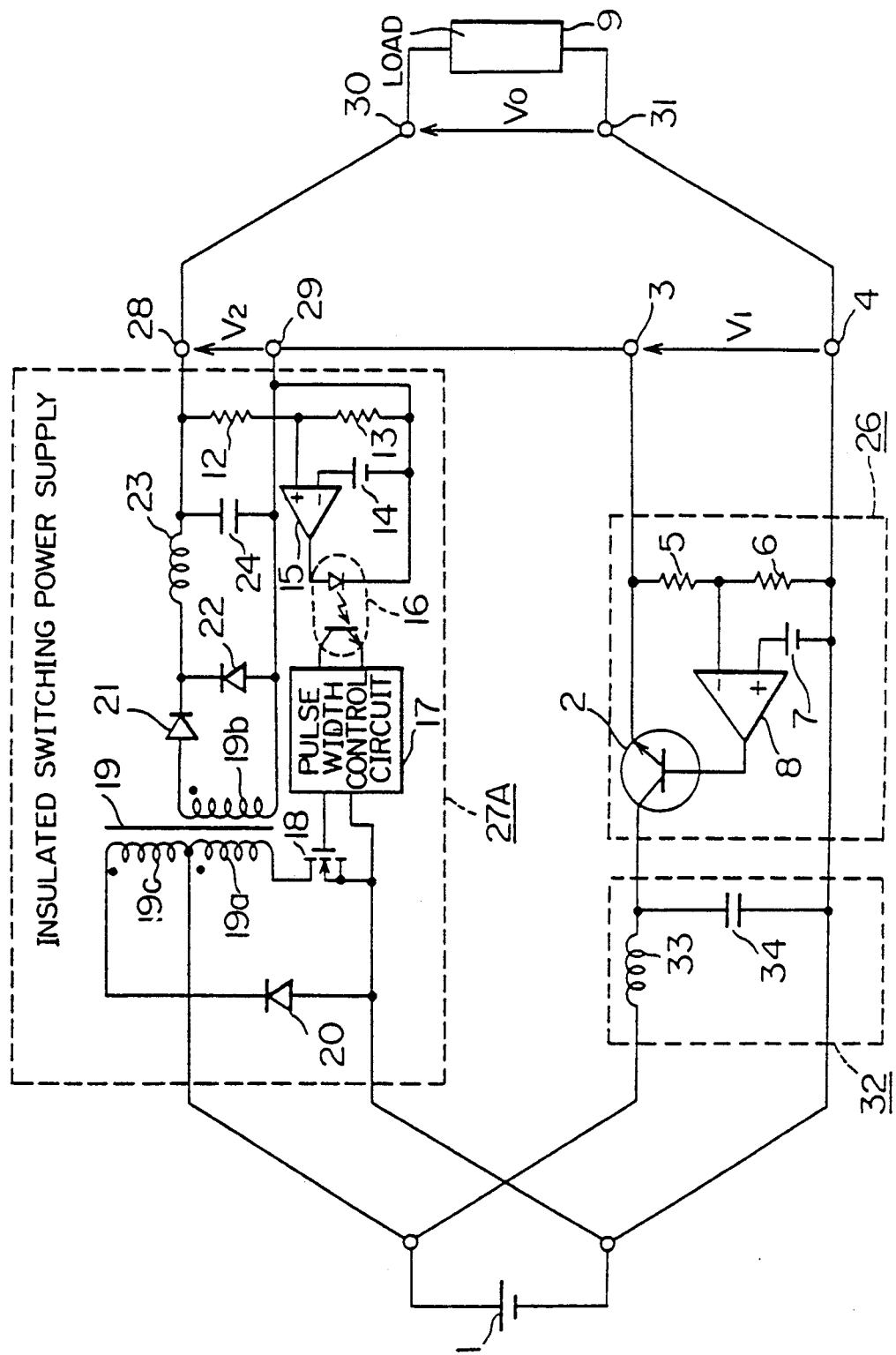
FIG. 2 is a circuit diagram showing a DC-DC converter according to the first embodiment of the invention.
Figure 15:
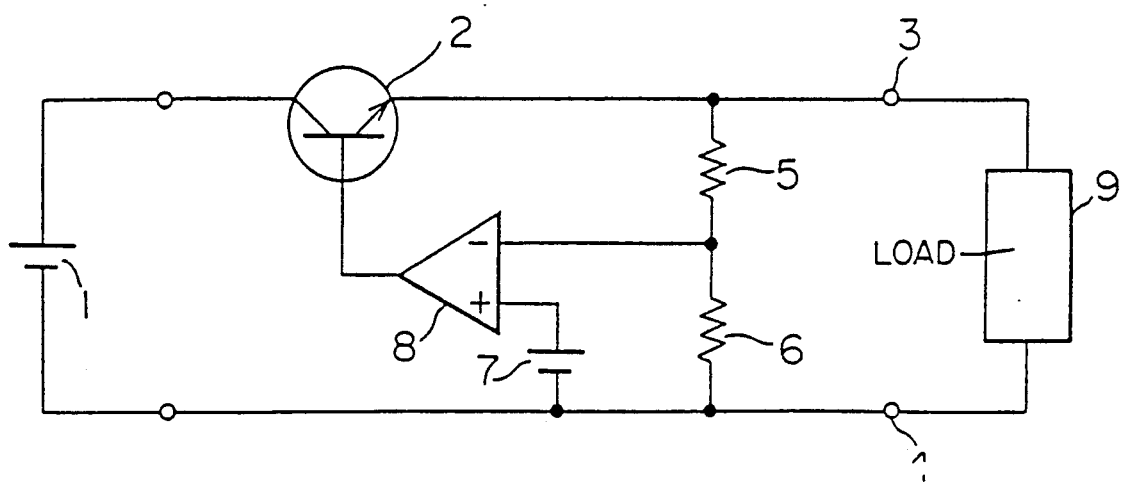
FIG. 15 is a circuit diagram showing a DC-DC converter of prior art.
Figure 16:
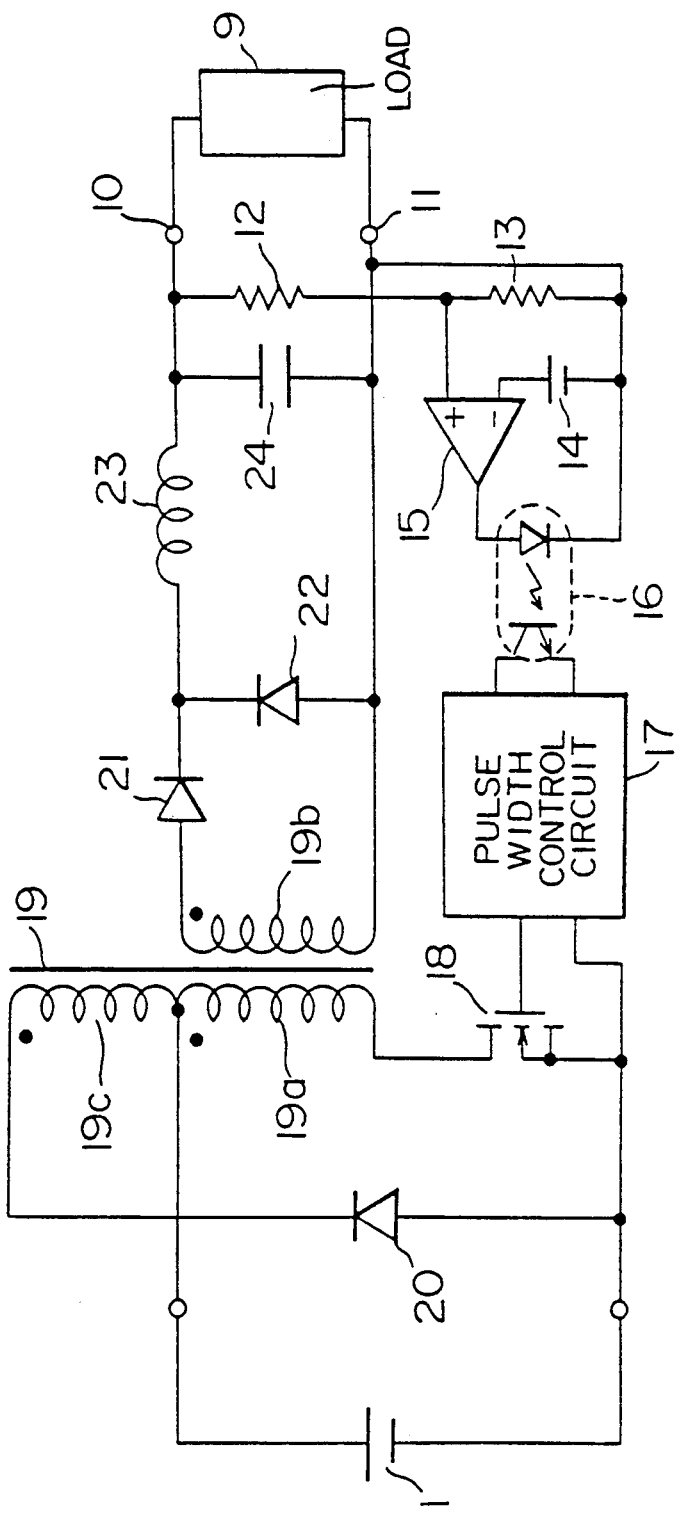
FIG. 16 is a circuit diagram showing other DC-DC converter of prior art.
Figure 17:
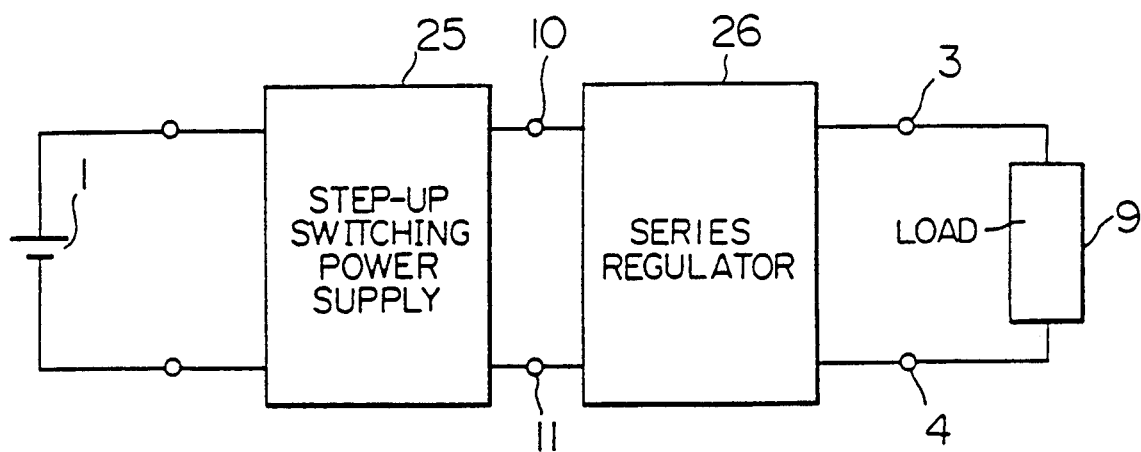
FIG. 17 is a block diagram showing a step-up DC-DC converter of prior art.

FIG. 2 is a circuit diagram showing the specific configuration of an embodiment in which a forward converter shown in FIG. 16 is employed as an insulated switching power supply. In FIG. 2, 27A indicates an insulated switching power supply. A series regulator 26 is connected indirectly to a dc power supply 1 via a filter for removing ripple current from the input of the series regulator. In FIG. 2, 32 denotes the filter. 33 and 34 are a choke coil and a capacitor respectively, forming the filter 32. The other devices are identical or equivalent to those assigned the same numbers in FIGS. 15 and 16. The description, therefore, is omitted. The series regulator 26 and filter 32 form a first converter circuit, and the insulated switching power supply 27A, a second converter circuit.

The operations of the foregoing embodiment are explained below.

Figure 3A:
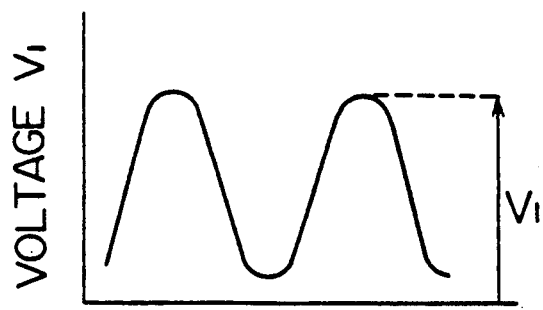
FIGS. 3A to 3C show waveforms helping explain the operations.
Figure 3B:
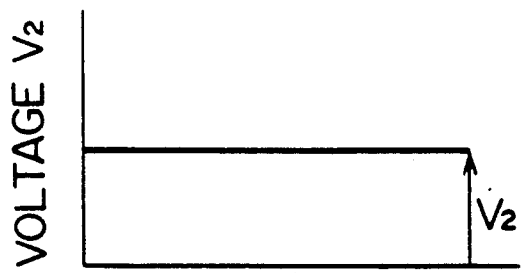
Figure 3C:
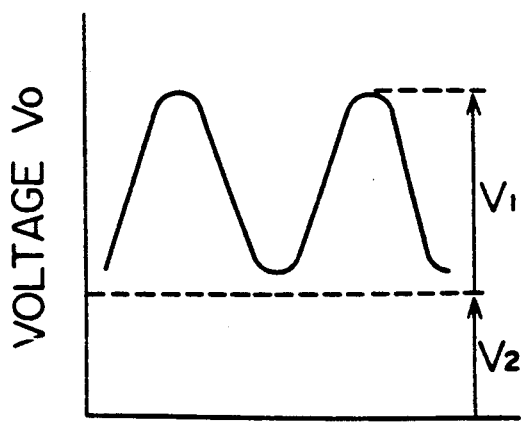

FIGS. 3A to 3C show waveforms helping explain the operations. FIG. 3A shows the time-sequential change in voltage $V_1$ between output terminals 3 and 4 of the series regulator 26, FIG. 3B, that in voltage $V_2$ between output terminals 28 and 29 of the switching power supply 27A, and FIG. 3C, that in output voltage $V_0$ fed from output terminals 30 and 31 to the load 9.

In a DC-DC converter having the configuration shown in FIG. 2, when command voltage (first command signal) fed from a command power supply 7 of a series regulator 26 is varied at a high frequency, output voltage $V_1$ shown in FIG. 3A is developed accordingly between the output terminals 3 and 4 of the series regulator 26. The output voltage $V_1$ varies in the range from 0 V to the input voltage level fed from the dc power supply 1 at the same high frequency as the command voltage.

On the other hand, the output voltage of the insulated switching power supply 27A, as explained in "Description of the Prior Art," is determined according to the command voltage of a reference power supply 14 (second command signal). Therefore, when the command voltage of the command power supply 14 is held constant, the switching power supply 27A develops constant dc voltage $V_2$ shown in FIG. 3B between the output terminals 28 and 29.

Herein, the high-potential output terminal 3 of the series regulator 26 is connected to the low-potential output terminal 29 of the switching power supply 27A. In the switching power supply 27A, the dc power supply is connected to a primary winding 19a of a transformer 19, and the load, to a secondary winding 19b of the transformer 19. The dc power supply and the load are mutually insulated, and their controls are disconnected at the ends by a photocoupler 16. Thereby, the voltage between the output terminals 3 and 4 can be simply combined with that between the output terminals 28 and 29. Therefore, output voltage $V_0$ in which voltage $V_1$ is superimposed on voltage $V_2$, or a dc voltage in which high-frequency ac voltage is superimposed and then stepped up, as shown in FIG. 3C, is developed between the output terminals 30 and 31 of the DC-DC converter.

The peak value of the output voltage $V_0$ can be made higher than the input voltage fed from the dc power supply 1. This allows the switching power supply 27A to vary output voltage at high frequencies, which used to be unfeasible because of the restriction of the switching frequency or the cutoff frequency of a filter. In this case, the ground (negative) terminal of the dc power supply 1 and the low-potential output terminal 31 of the DC-DC converter can be formed as a common. Herein, the filter 32 is installed so that the influence of ripple, which is included in the input voltage fed from the dc power supply 1 by the switching operation of the switching power supply 27A, will not appear between the output terminals 3 and 4 of the series regulator 26.

Figure 2A:
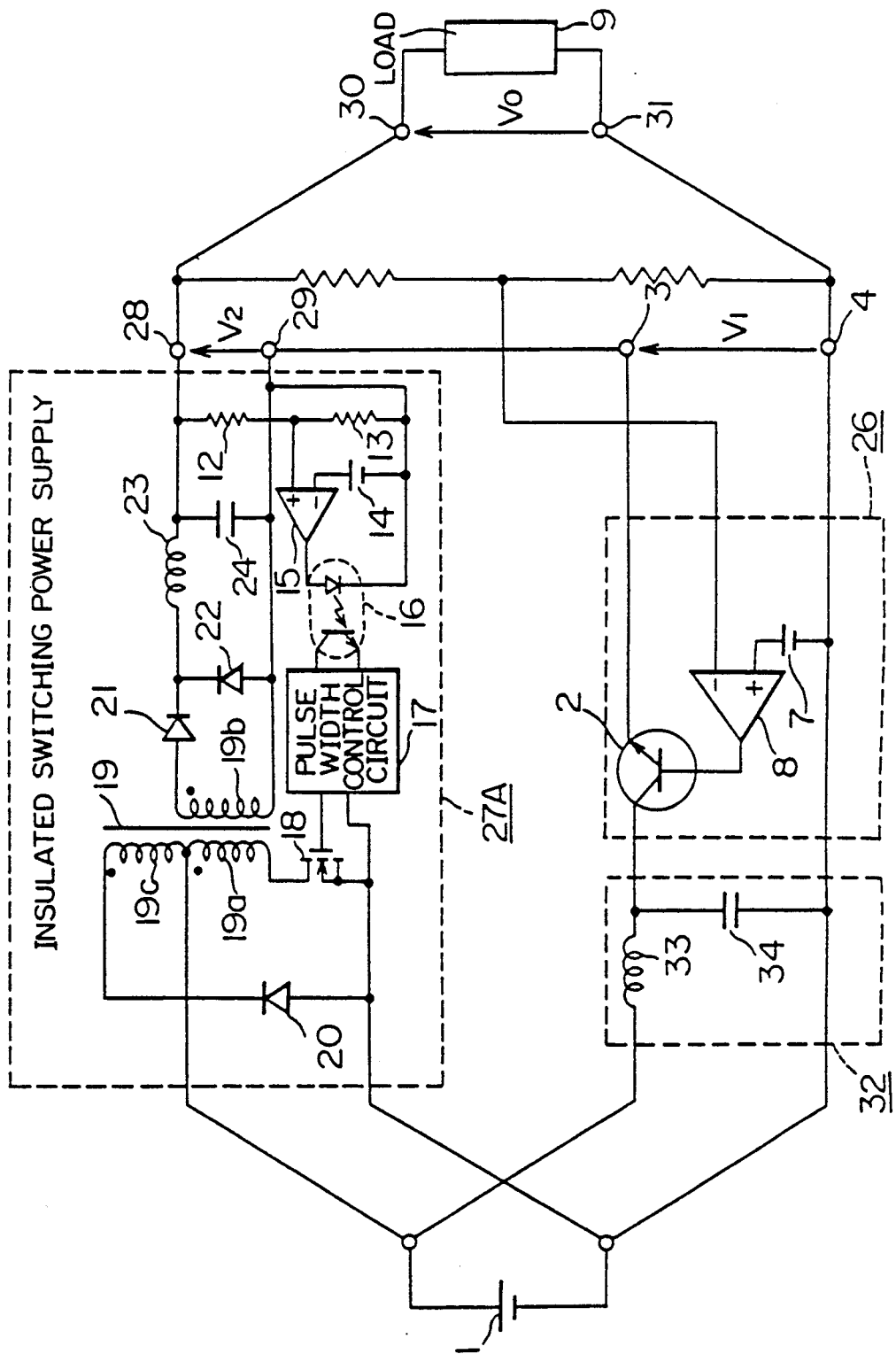
FIG. 2A is a circuit diagram showing a modified DC-DC converter according to the first embodiment.

In the aforesaid embodiment, voltage $V_1$ between the output terminals 3 and 4 of the series regulator 26, and voltage $V_2$ between the output terminals 28 and 29 of the switching power supply 27A are detected independently to control voltage $V_0$ between the output terminals 30 and 31 of the DC-DC converter. As shown in FIG. 2A, voltage $V_0$ between the output terminals 30 and 31 may be detected to control voltage $V_1$ between the output terminals 3 and 4 of the series regulator 26 or voltage $V_2$ between the output terminals 28 and 29 of the switching power supply 27A. In FIG. 2A, voltage $V_0$ is detected to control output voltage $V_1$ of the series regulator 26.

EMBODIMENT 2

Figure 4:
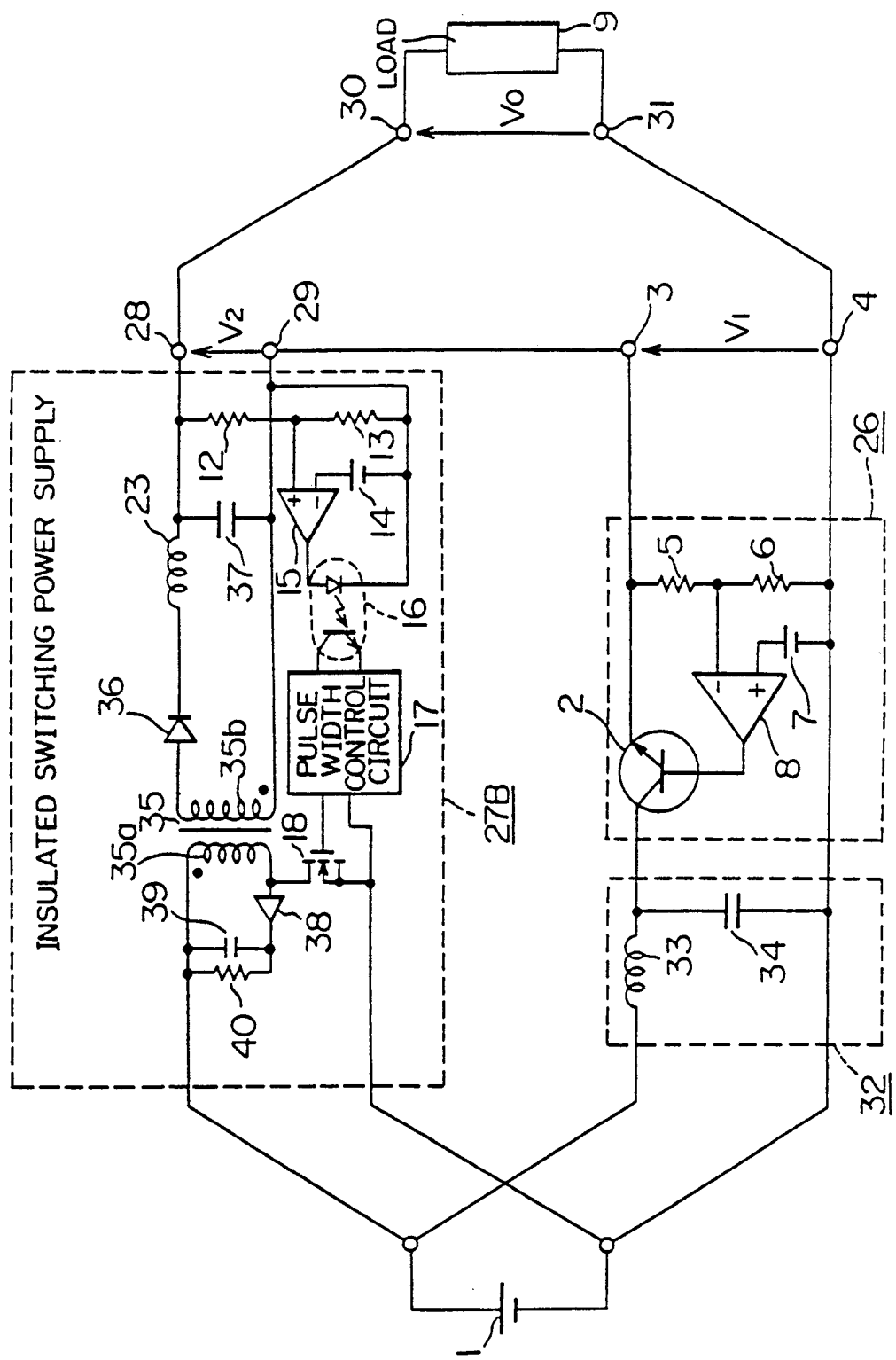
FIG. 4 is a circuit diagram showing a DC-DC converter according to the second embodiment of the invention.

In the aforesaid embodiment, a forward converter is used as a switching power supply. Other kind of insulated switching power supply may be employed. FIG. 4 is a circuit diagram showing an embodiment in which a flyback converter is used as a switching power supply. In FIG. 4, the same devices as those indicated in FIG. 2 are assigned the same numbers. The description is omitted. In FIG. 4, 27B denotes a switching power supply, and 35, a transformer equipped with a primary winding 35a and a secondary winding 35b. The primary winding 35a is connected to the positive terminal of a dc power supply 1 and the output of a switching element 18. 36 is a diode in which the anode is connected to one side of the secondary winding 35b in the transformer 35, and the cathode, to the high-potential output terminal 28. 37 denotes a smoothing capacitor connected between output terminals 28 and 29. The secondary winding 35b of the transformer 35 is connected to a low-potential output terminal 29.

38 is a diode whose anode is connected to the junction of the switching element 18 and the primary winding 35a of the transformer 35. 39 and 40 are a capacitor and a resistor connected in parallel between the cathode of the diode 38 and the positive terminal of the dc power supply 1.

Even in this embodiment, in the switching power supply 27B, the circuits connected to the dc power supply and the load are mutually insulated by the transformer 35. Their controls are also disconnected at the ends by the photocoupler 16. Output voltage $V_0$ or the simple sum of output voltage $V_1$ of the series regulator 26 and output voltage $V_2$ of the switching power supply 27B is developed between the output terminals 30 and 31.

EMBODIMENT 3

Figure 5:
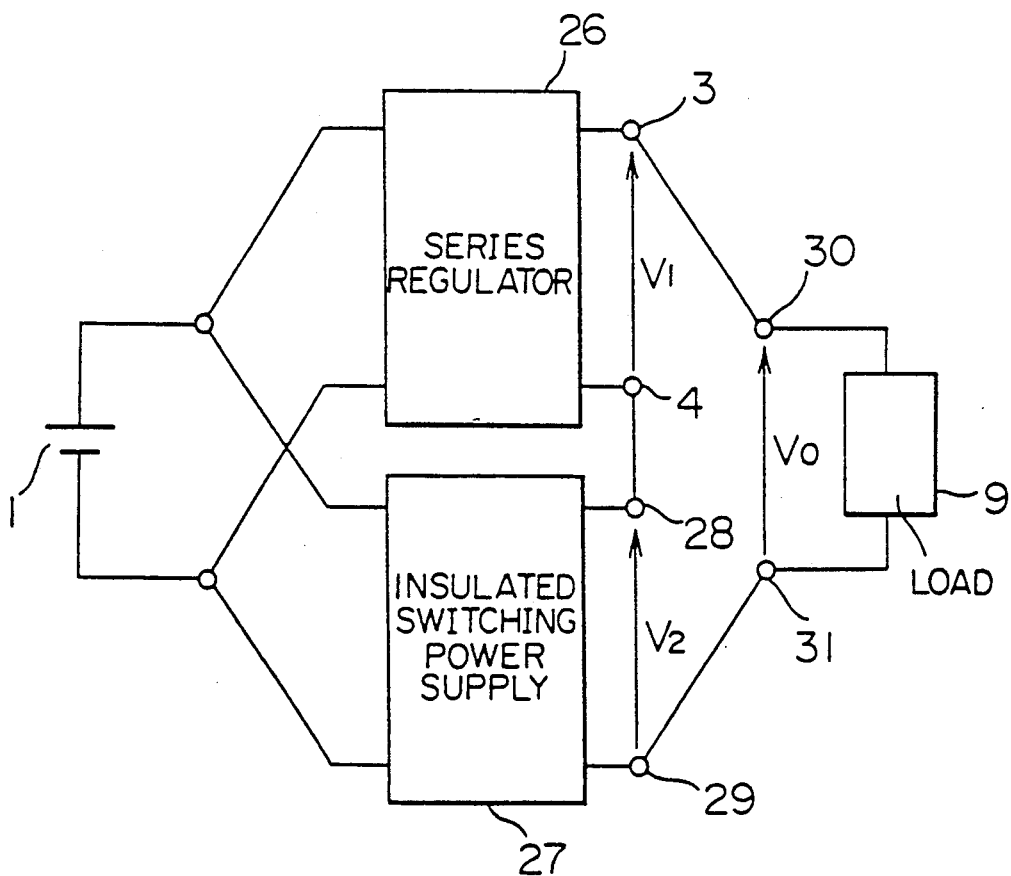
FIG. 5 is a block diagram showing a DC-DC converter according to the third embodiment of the invention.

In the foregoing embodiment, a high-potential output terminal 3 of a series regulator 26 is connected to a low-potential output terminal 29 of a switching power supply 27A or 27B, a low-potential output terminal 4 of the series regulator 26 is connected to a low-potential output terminal 31 of the DC-DC converter, and a high-potential output terminal 28 of the switching power supply 27A or 27B is connected to a high-potential output terminal 30 of the DC-DC converter. As shown in FIG. 5, the low-potential output terminal 4 of the series regulator 26 may be connected to the high-potential output terminal 28 of the switching power supply 27, the high-potential output terminal 3 of the series regulator 26, to the high-potential output terminal 30 of the DC-DC converter, and the low-potential output terminal 29 of the switching power supply 27, to the low-potential output terminal 31 of the DC-DC converter. In this case, the operations are identical to those explained previously. However, the ground (negative) terminal of the dc power supply 1 and the low-potential output terminal 31 of the DC-DC converter cannot be formed as a common node.

Figure 6A:
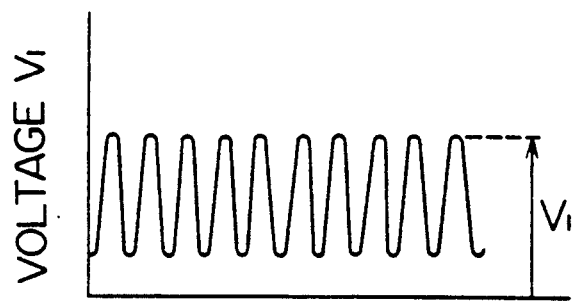
FIGS. 6A to 6C show waveforms helping explain other example of the operations of a DC-DC converter.
Figure 6B:
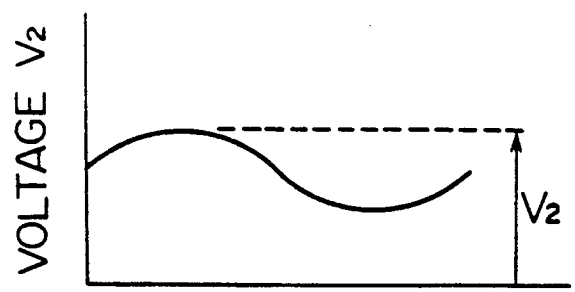
Figure 6C:
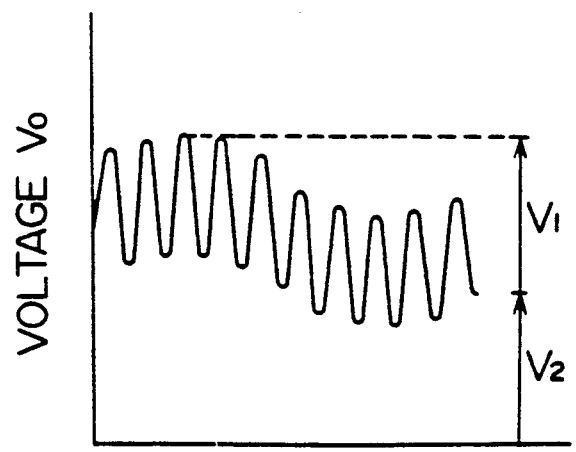

In the aforesaid embodiments, output voltage of the switching power supply is constant. The output voltage may be varied at low frequencies. FIGS. 6A to 6C show the waveforms, helping explain the operation of the switching power supply. The X axis represents time, and the Y axis, voltage.

As shown in FIG. 6A, output voltage $V_1$ of a series regulator 26 is varied at a high frequency. On the other hand, as shown in FIG. 6B, output voltage $V_2$ of a switching power supply 27 is varied at a low frequency which is sufficiently lower than the switching frequency or the cutoff frequency of the filter. The changes in the output voltages $V_1$ and $V_2$ are controlled by varying command voltage of the command power supply 7 or 14 at a given frequency.

Thereby, a maximum voltage having a higher peak value than the input voltage of the dc power supply 1, having the waveform shown in FIG. 6C, is outputted between the output terminals 30 and 31 of the DC-DC converter. Moreover, the output voltage can be varied depending on high-frequency command voltage.

EMBODIMENT 4

Figure 7:
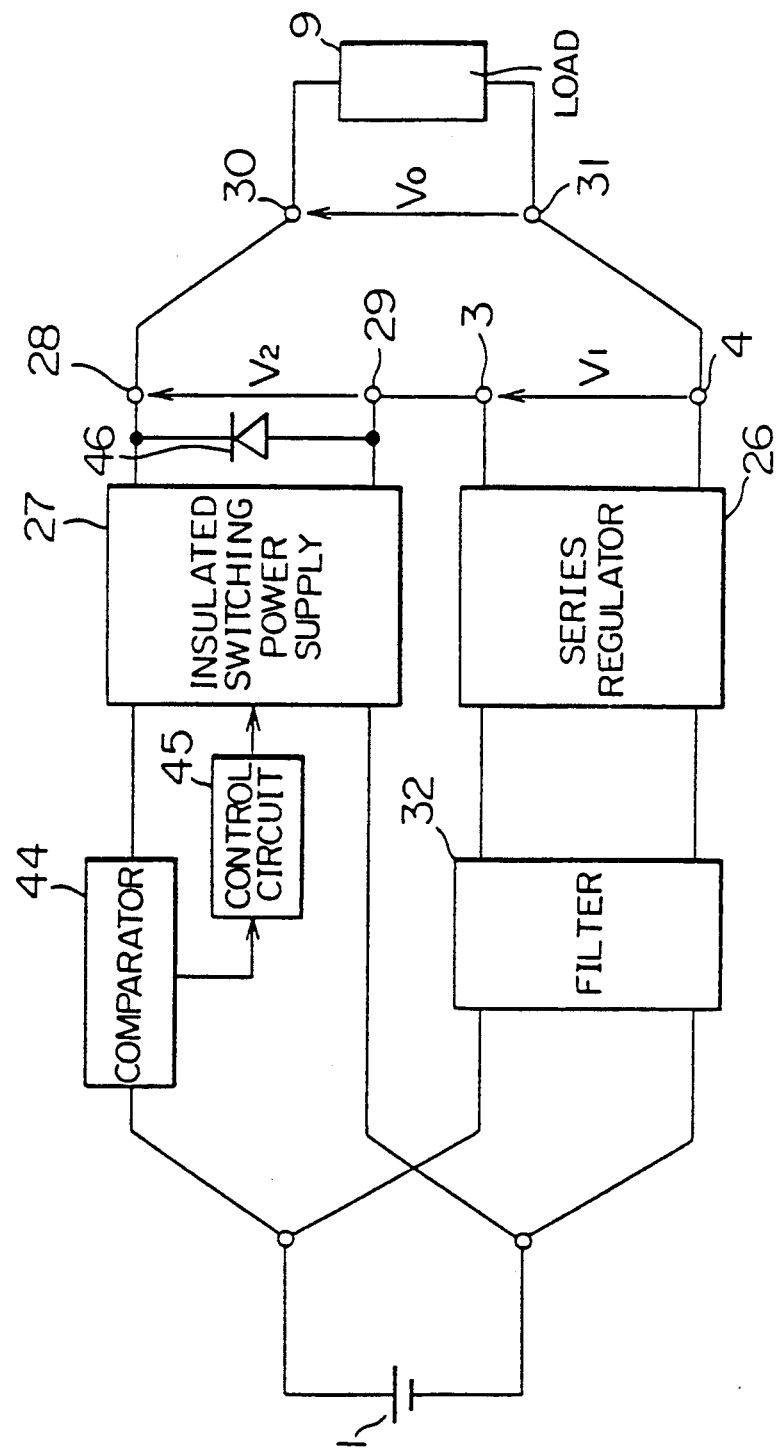
FIG. 7 is a block diagram showing a DC-DC converter according to the fourth embodiment of the invention.

In the aforesaid embodiments, the DC-DC converters output dc voltage $V_0$ on which high-frequency voltage $V_1$ is superimposed. The DC-DC converters may be modified to output dc voltage having a constant peak value. FIG. 7 shows the configuration of such a DC-DC converter.

In FIG. 7, 44 denotes a voltage comparator connected in series with a dc power supply 1. 45 denotes a control circuit for controlling the switching operation of an insulated switching power supply 27 in response to the signal sent from the comparator 44. 46 is a diode for preventing reverse voltage, and the diode 46 is connected between output terminals 28 and 29 of the switching power supply 27.

The DC-DC converter having the foregoing configuration is independent of input voltage fed from the dc power supply 1. When the input voltage is higher than an output voltage $V_0$, the DC-DC converter acts as a series regulator. When the input voltage drops below the output voltage $V_0$, the DC-DC converter serves as a composite circuit of the switching power supply and series regulator. That is to say, the input voltage fed from the dc power supply 1 is compared with a reference voltage by the comparator 44. If the input voltage is higher than the reference voltage, the switching operation of the switching power supply 27 is suspended with a signal sent from a control circuit 45. Thereby, only the series regulator 26 operates to supply constant output voltage $V_0$ to a load 9.

When the input voltage of the dc power supply 1 becomes lower than the reference voltage, the switching operation of the switching power supply 27 restarts with a control signal sent from the control circuit 45 based on the comparison result of the comparator 44. Then, voltage $V_1$ between output terminals 3 and 4 of the series regulator 27 and voltage $V_2$ between output terminals 28 and 29 of the switching power supply 27 are combined to generate composite voltage, output voltage $V_0$. The constant output voltage $V_0$ is supplied to the load 9 via output terminals 30 and 31. The reference voltage corresponds to the output voltage $V_0$.

EMBODIMENT 5

Figure 8:
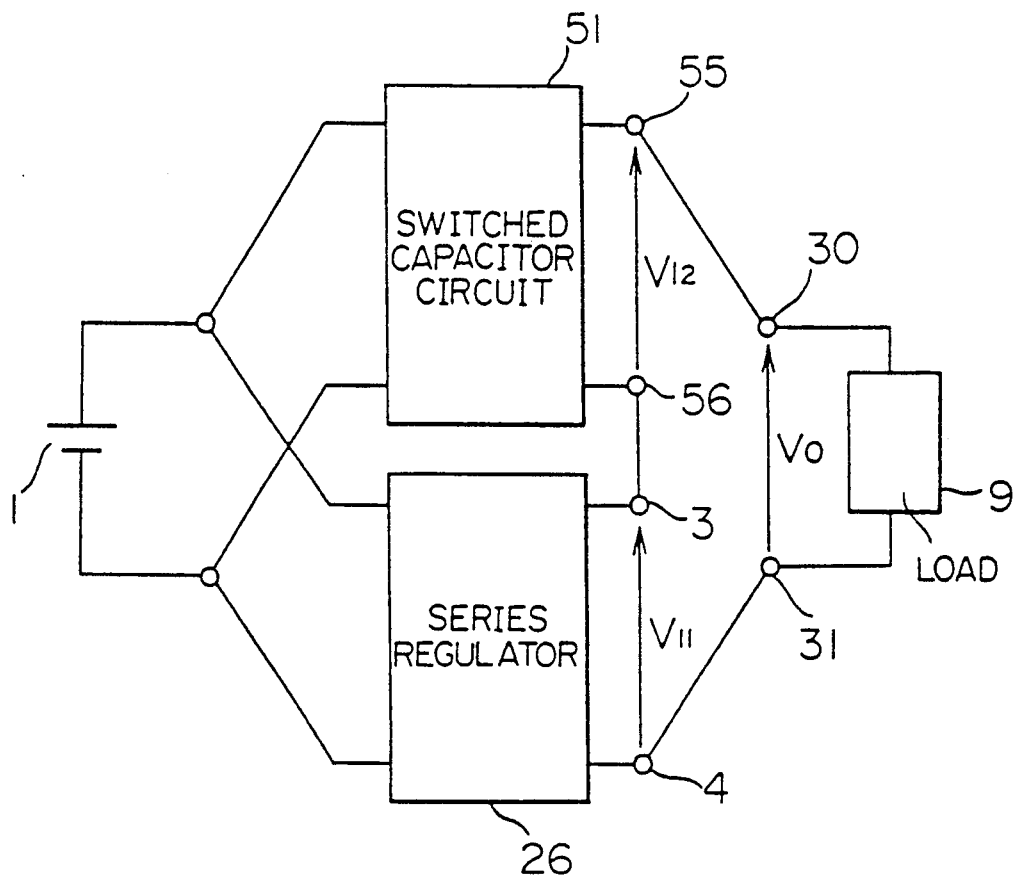
FIG. 8 is a block diagram showing a DC-DC converter according to other embodiment of the invention.

FIG. 8 is a block diagram showing a DC-DC converter according to other embodiment of the invention. In FIG. 8, 51 denotes a switched capacitor circuit (charge pump circuit), wherein the input terminals are connected to a dc power supply 1 in parallel with a series regulator 26, and the output terminals are connected in series with the outputs of the series regulator 26 so that the output voltage of the switched capacitor circuit 51 can be combined with that of the series regulator 26. 55 and 56 are high-potential and low-potential output terminals. In this embodiment, the high-potential output terminal 3 of the series regulator 26 is connected to the low-potential output terminal 56 of the switched capacitor circuit 51.

Figure 9:
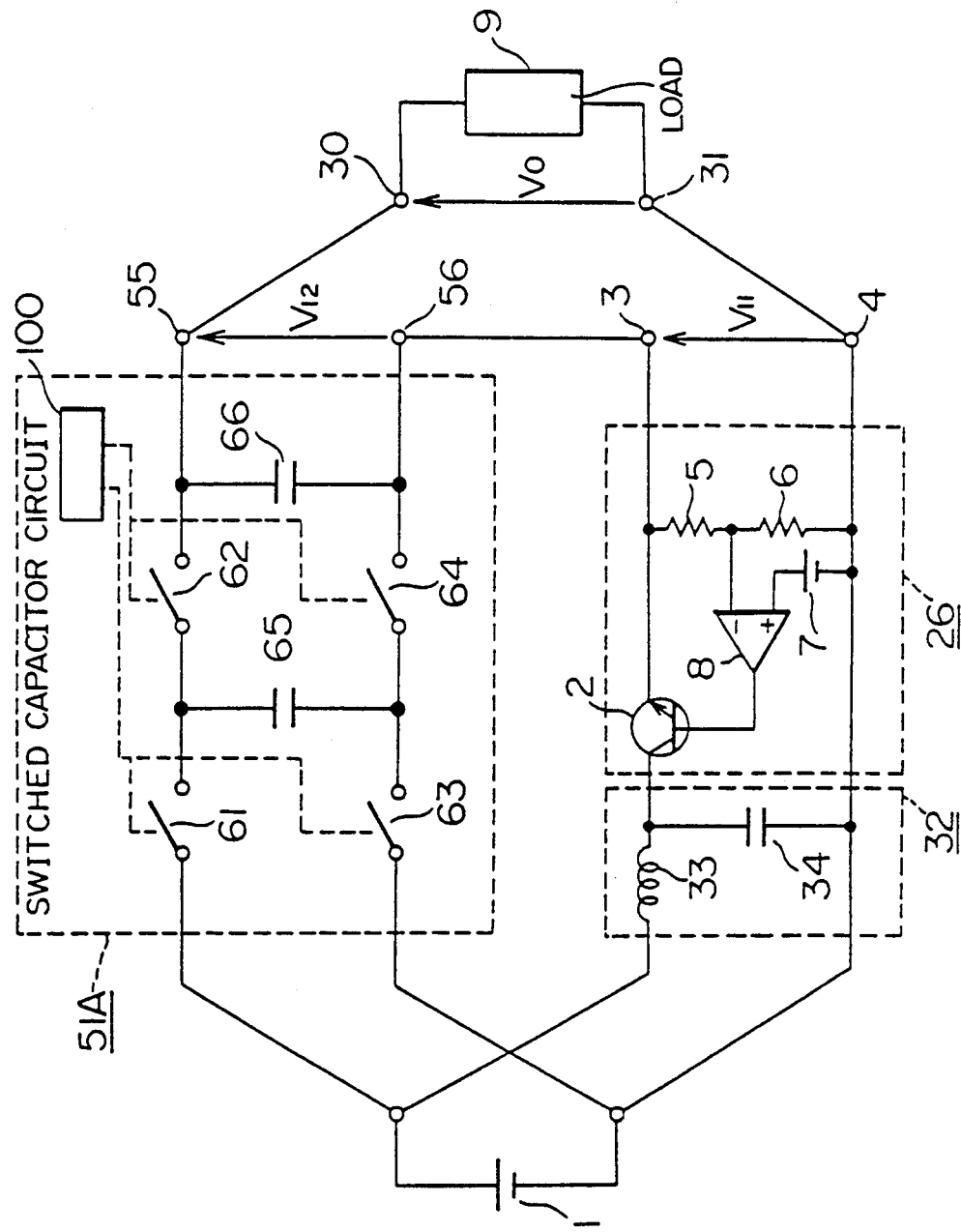
FIG. 9 is a circuit diagram showing a DC-DC converter according to the fifth embodiment of the invention.

FIG. 9 is a circuit diagram showing the embodiment of FIG. 8 in more detail. In FIG. 9, 51A denotes a switched capacitor circuit. 61 to 64 are switches using transistors. One end of the switch 61 is connected to the positive terminal of a dc power supply 1, and the other end, to one end of the switch 62. One end of the switch 63 is connected to the negative terminal of the dc power supply 1, and the other end, to one end of the switch 64. 65 denotes a capacitor connected between the junction of the switches 61 and 62, and the junction of the switches 63 and 64. 66 is a capacitor connected between the junction of the other end of the switch 62 and the output terminal 55, and the junction of the other end of the switch 64 and the output terminal 56. The series regulator 26 and filter 32 are identical to those employed in the first embodiment. The series regulator 26 and filter 32 form a first converter circuit, and the switched capacitor 51, a second converter circuit.

The operations of the foregoing embodiment are explained below.

Figure 10A:
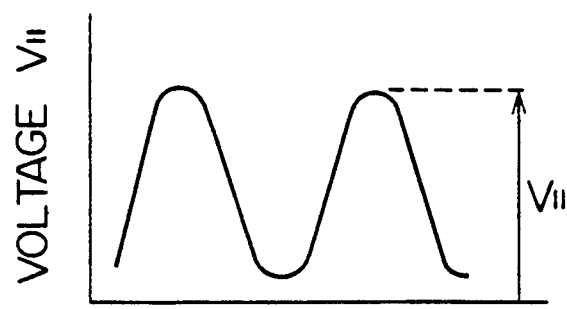
FIGS. 10A to 10C show waveforms helping explain the operations of the DC-DC converter shown in FIG. 9.
Figure 10B:
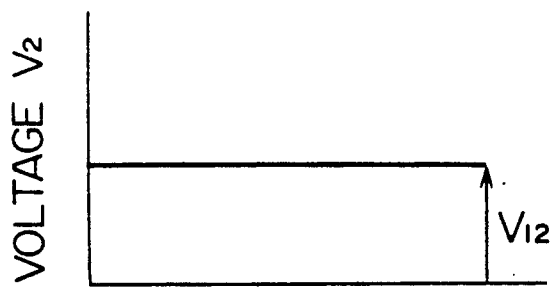
Figure 10C:
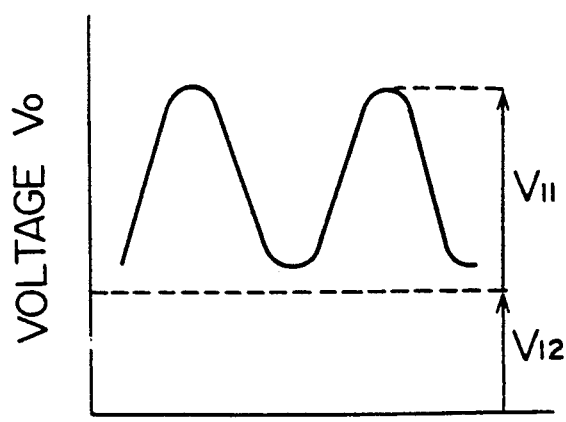

FIGS. 10A to 10C show waveforms, helping explain the operations. FIG. 10A shows the time-sequential change in voltage $V_{11}$ between output terminals 3 and 4 of a series regulator 26, FIG. 10B, that in voltage $V_{12}$ between output terminals 55 and 56 of a switched capacitor 51A, and FIG. 10C, that in output voltage $V_0$ provided to a load 9 via output terminals 30 and 31.

In the DC-DC converter having the configuration shown in FIG. 9, when command voltage is varied at a high frequency by a command power supply 7 of the series regulator 26, output voltage $V_{11}$ shown in FIG. 10A is developed accordingly between the output terminals 3 and 4 of the series regulator 26. The output voltage $V_{11}$ varies in the range from 0 V to the input voltage level fed from the dc power supply 1 at the same high frequency as the command voltage.

On the other hand, switches 61 and 63 are turned on simultaneously according to the signal sent from an oscillator in a switch controller 100. At this time, switches 62 and 64 are off. Therefore, in a capacitor 65, a terminal connected to the switch 61 is placed high-potential, and other terminal connected to the switch 63, low-potential. Consequently, the capacitor 65 is charged with supply voltage of the dc power supply 1.

Next, after a given time has elapsed, with the signal sent from the oscillator, the switches 61 and 63 are turned off simultaneously, while the switches 62 and 64 are turned on simultaneously. With the switching operation, electric charge stored in the capacitor 65 moves to a capacitor 66. In the capacitor 66, a terminal connected to the switch 62 is placed high-potential, and other terminal connected to the switch 64, low-potential. Consequently, the capacitor 66 is charged with supply voltage of the dc power supply 1.

As described above, the switched capacitor circuit 51A develops dc voltage between the output terminals 55 and 56. As shown in FIG. 10B, the dc voltage has the same level as that of the supply voltage of the dc power supply 1. Herein, the on and off operations of the switches 61 and 63, and 62 and 64 may not be fully synchronized as far as the timing difference is much smaller than the switching time. The switches 61 and 62 or the switches 63 and 64 are controlled so that they will not be turned on simultaneously.

The high-potential output terminal 3 of the series regulator 26 is connected to the low-potential output terminal 56 of the switched capacitor circuit 51A. Therefore, output voltage $V_0$ in which voltage $V_{11}$ is superimposed on voltage $V_{12}$ or dc voltage in which high-frequency ac voltage is superimposed and stepped up, as shown in FIG. 10C, is developed between the output terminals 30 and 31 of the DC-DC converter.

The configuration of the foregoing embodiment can be modified so that the output voltage $V_0$ will have a higher peak value than the input voltage fed from the dc power supply 1. Even in the modified configuration, the switching power supply 27 can vary output voltage at high frequencies, which used to be unfeasible because of the restriction of the switching frequency or the cutoff frequency of a filter. Another feature is that the ground (negative) terminal of the dc power supply 1 and the low-potential output terminal 31 of the DC-DC converter can be formed as a common node.

In the aforesaid embodiment, voltage $V_{11}$ between output terminals 3 and 4 of a series regulator 26 is detected to control voltage $V_0$ between output terminals 30 and 31 of the DC-DC converter. Similarly to the embodiment shown in FIG. 2A, voltage $V_0$ between the output terminals 30 and 31 is detected to control voltage $V_{11}$ between the output terminals 3 and 4 of the series regulator 26. This configuration has an advantage that even when voltage $V_{12}$ between output terminals 55 and 56 of a switched capacitor circuit 51A varies due to the fluctuation in supply voltage of the dc power supply 1, the variation can be compensated for.

EMBODIMENT 6

Figure 11:
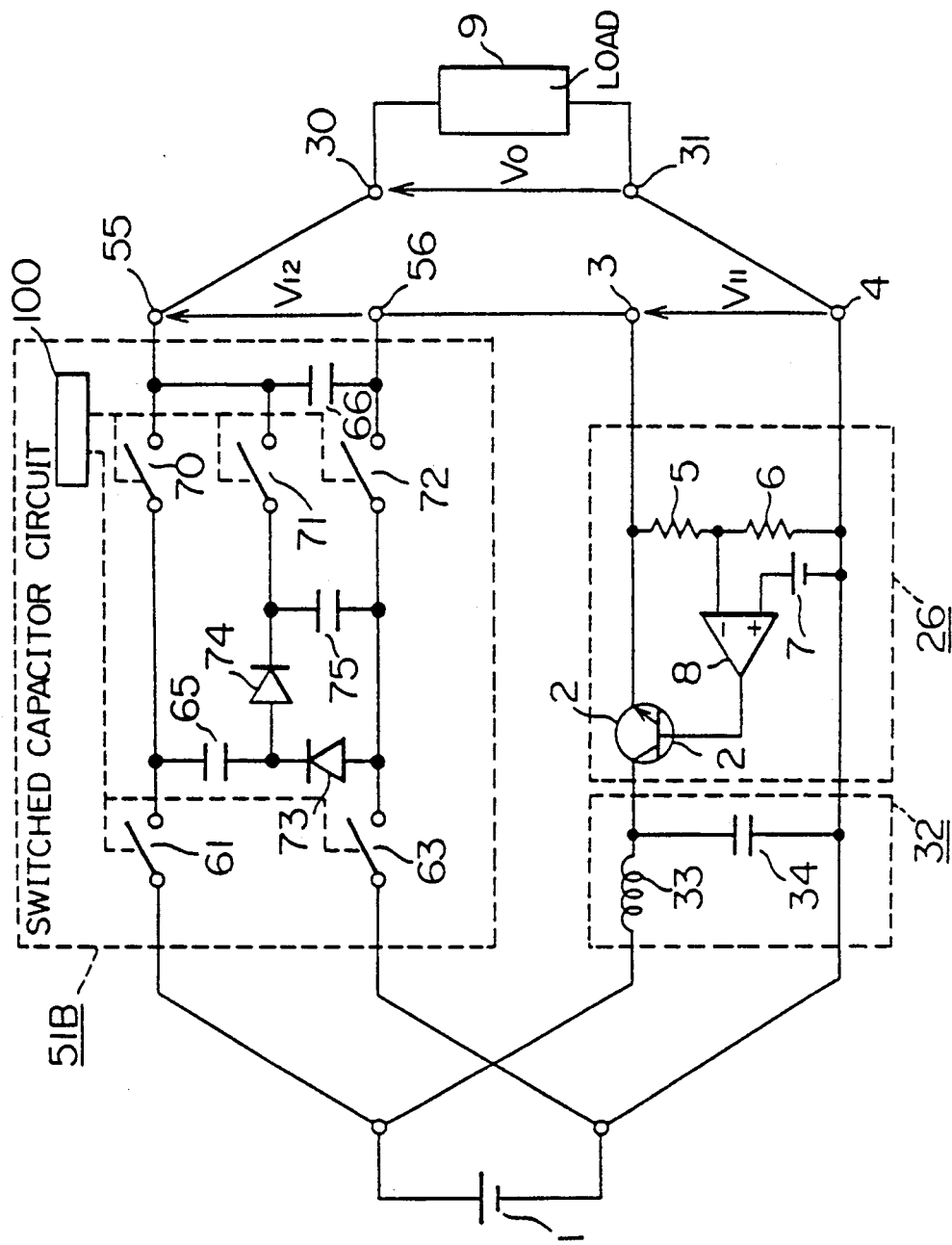
FIG. 11 is a circuit diagram showing a DC-DC converter according to the sixth embodiment of the invention.

In the foregoing embodiment, a voltage $V_{12}$ between output terminals 55 and 56 of the switched capacitor circuit 51A is almost equal to a supply voltage of the dc power supply. The configuration may be modified so that the voltages may differ from each other. FIG. 11 shows the configuration of a DC-DC converter in which an output voltage of a switched capacitor circuit 51B or a second converter circuit is lower than a supply voltage of a dc power supply 1.

In FIG. 11, 70, 71, and 72 are switches using transistors. The switch 70 is connected between the switch 61 and a high-potential output terminal 55, and the switch 72, between the switch 63 and a low-potential output terminal 56. 73 denotes a diode whose anode is connected to a switch 63 and cathode is connected to one end of a capacitor 65. 74 is a diode whose anode is connected to the cathode of the diode 73 and cathode is connected to one end of a capacitor 75. The other end of the capacitor 75 is connected to the switches 63 and 72. As for the switch 71, one end is connected to the cathode of the diode 74, and the other end, to the high-potential output terminal 55. One end of a capacitor 66 is connected to the switch 71 and the output terminal 55, and the other end, to the output terminal 56. The capacitance of the capacitor 65 is set to be identical to that of the capacitor 75.

The operations of the foregoing embodiment are explained below.

In a switched capacitor circuit 51B, switches 61 and 63 are turned on simultaneously with a signal sent from an oscillator in a switch controller 100. At this time, switches 70, 71, and 72 are off. Therefore, a diode 74 is conducting. Then, capacitors 65 and 75 are charged with a voltage that is almost half of the supply voltage of a dc power supply 1.

Next, after a given time has elapsed, according to the signal sent from the oscillator, the switches 61 and 63 are turned off simultaneously, while the switches 70, 71, and 72 are turned on simultaneously. With the switching operation, electric charge stored in the capacitor 75 moves to a capacitor 66. When a diode 73 becomes conducting, and the diode 74, nonconducting, electric charge stored in the capacitor 65 moves to the capacitor 66. As a result, in the capacitor 66, a terminal connected to an output terminal 55 is placed high-potential, and the other connected to an output terminal 56, low-potential. Consequently, the capacitor 66 is charged with a voltage that is almost half of the supply voltage of the dc power supply.

As described above, a switched capacitor circuit 51B develops dc voltage, whose level is half of the supply voltage of the dc power supply 1, between the output terminals 55 and 56. Therefore, output voltage $V_0$ between output terminals 30 and 31 of the DC-DC converter contains $V_{12}$ whose level is smaller by a dc bias.

EMBODIMENT 7

Figure 12:
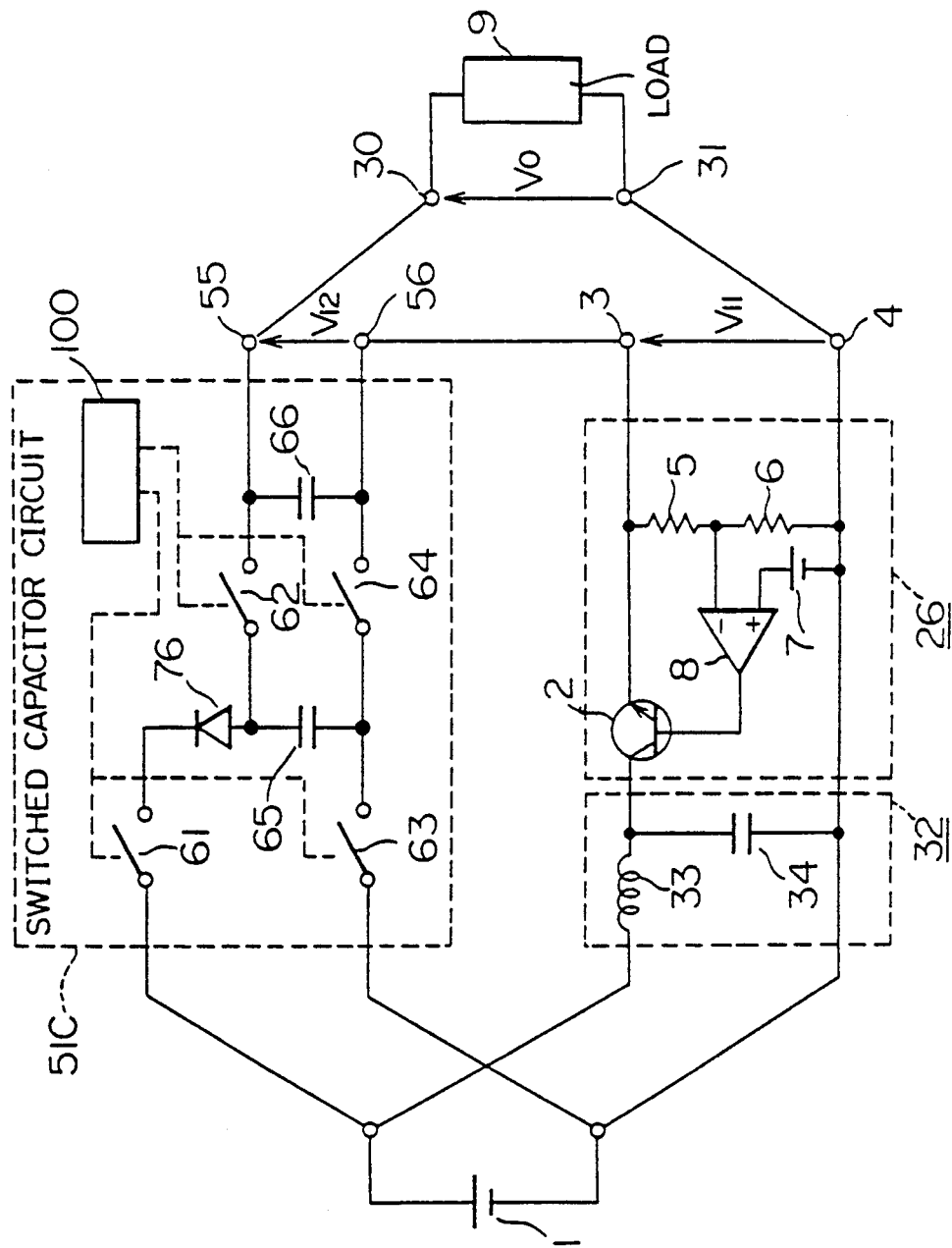
FIG. 12 is a circuit diagram showing a DC-DC converter according to the seventh embodiment of the invention.

When the switched capacitor circuit is modified using a constant voltage diode, the output voltage $V_{12}$ may be set to a value lower than a supply voltage of a dc power supply 1. FIG. 12 shows the configuration of a DC-DC converter employing this kind of switched capacitor circuit 51C. In this case, the constant voltage diode 76 suppresses the charging voltage for capacitors 65 and 66 to be lower than the supply voltage of the dc power supply 1. The operations are identical to those of EMBODIMENT 5 (FIG. 9).

EMBODIMENT 8

Figure 13:
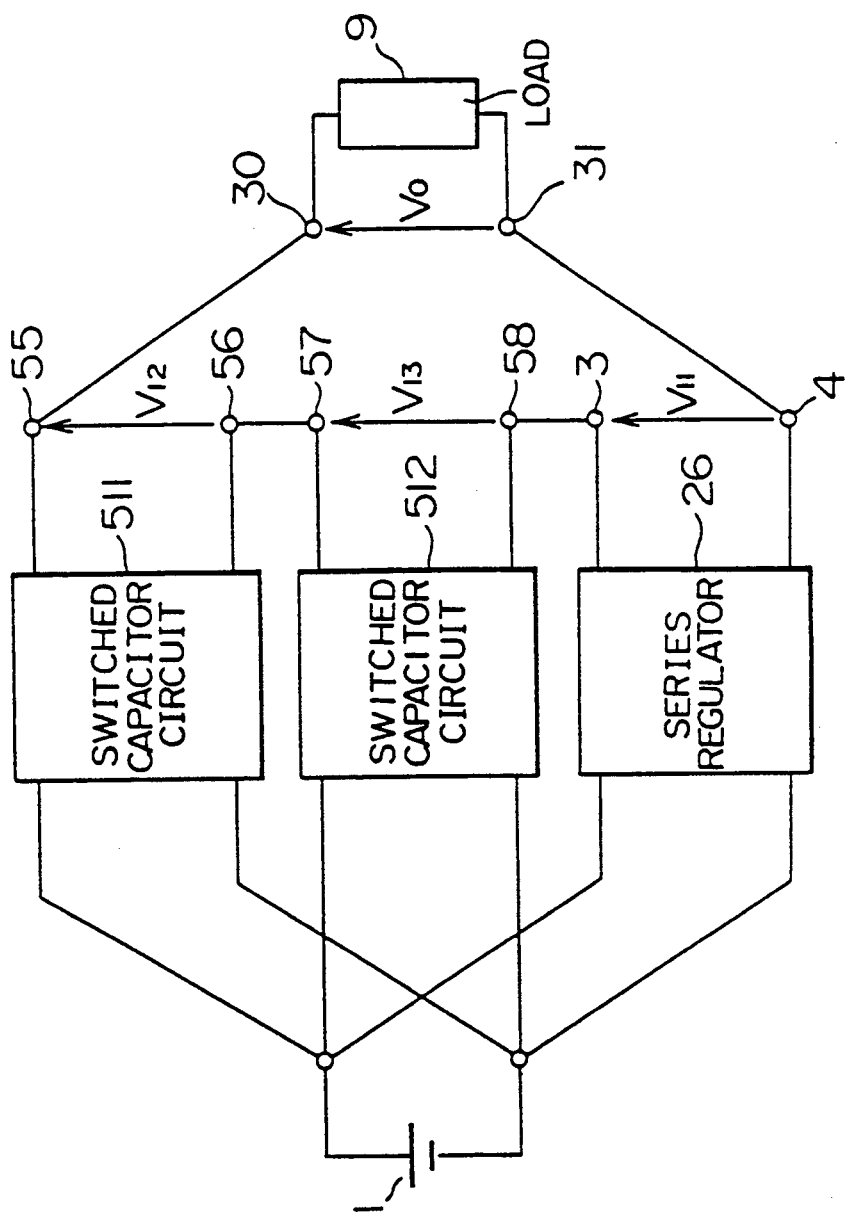
FIG. 13 is a block diagram showing a DC-DC converter according to the eighth embodiment of the invention.

A plurality of switched capacitor circuits may be used to obtain output voltage $V_0$. FIG. 13 is a block diagram showing a DC-DC converter which is so configured. In this case, the output voltage $V_0$ of the DC-DC converter is the sum of output voltage $V_{11}$ of a series regulator 26, output voltage $V_{12}$ of a switched capacitor circuit 511, and output voltage $V_{13}$ of a switched capacitor circuit 512. Thus, higher-level output voltage $V_0$ is supplied. The switched capacitor circuit 51A shown in FIG. 9, the switched capacitor circuit 51B shown in FIG. 11, or the switched capacitor circuit 51C shown in FIG. 12 can be used as the switched capacitor circuit 511 or 512.

In the aforesaid embodiments, the DC-DC converters are of the output voltage varying type, using a switched capacitor circuit 51 and a series regulator 26. The DC-DC converters may be modified to output dc voltage having a constant peak value. In this case, merely by adding the output voltage of the series regulator 26 to that of the switched capacitor circuit 51, the DC-DC converters can be used as step-up DC-DC converters. Even when the output voltage of the switched capacitor circuit 51 varies depending on the fluctuation in input supply voltage, the series regulator 26 compensates for the variation. Thus, the configuration permits constant output voltage with high accuracy.

Next, an application of a DC-DC converter according to the present invention is explained.

Figure 14:
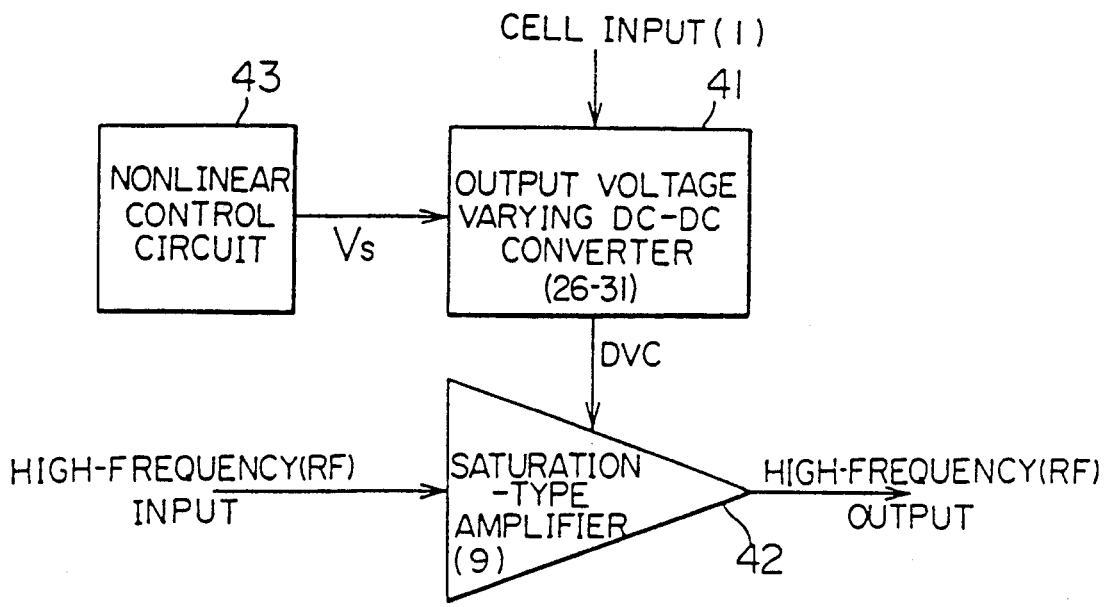
FIG. 14 is a block diagram helping explain an application of a DC-DC converter according to the invention.

FIG. 14 is a block diagram showing a high-frequency power amplifier of, for example, a portable telephone set in which a drain voltage control system (DVC) is implemented. In FIG. 14, 41 denotes an output voltage varying DC-DC converter or a DC-DC converter according to any of the aforesaid embodiments. 42 is a saturation-type amplifier which receives drain voltage supply and amplifies a high-frequency input. 43 denotes a nonlinear control circuit which gives a voltage signal $V_S$ for output voltage control to the DC-DC converter 41.

The high-frequency input including a carrier wave and a signal is fed to the saturation-type amplifier 42, then amplified in power. After that, the resultant high-frequency output is propagated as a radio wave via an antenna. At this time, the saturation-type amplifier 42 causes great distortion because it is a nonlinear amplifier. In an attempt to obtain an output equivalent to that of a linear amplifier, the high-frequency input is detected using the envelope (envelope detection), then a voltage signal $V_S$ in direct proportion to the input voltage is generated by the nonlinear control circuit 43. Depending on the voltage signal $V_S$, the output voltage varying DC-DC converter 41 with high power conversion efficiency varies drain voltage of an output-stage field effect transistor (hereafter, output-stage FET) in the saturation-type amplifier 42, then amplifies the input power. As a result, the saturation-type amplifier 42 causes less distortion and works more efficiently than conventional linear high-frequency amplifiers.

When a lithium cell or a nickel-cadmium cell is used as a dc power supply, the drain voltage of the output-stage FET in the saturation-type amplifier 42 should be higher than the input supply voltage depending on the voltage signal $V_S$ of the nonlinear control circuit 43, so that the high-frequency amplifier can provide sufficient output power and work efficiently. The output voltage varying DC-DC converter 41 is, therefore, desirable to be of the step-up type. To reduce leakage current from the high-frequency amplifier into an adjacent channel or a channel next to the adjacent channel, output voltage of the output voltage varying DC-DC converter must be able to be varied in response to very high frequencies ranging from 80 to 100 kHz.

The DC-DC converter according to the present invention can step up input voltage fed from a dc power supply and respond to command voltage for providing high-frequency output voltage, which, therefore, can serve as a drain voltage control power supply suitable for a high-frequency power amplifier of a potable telephone set.

As described above, according to the present invention, a DC-DC converter has a configuration that the input of the series regulator is connected in parallel with the input of the insulated switching power supply, and that the outputs of the insulated switching power supply and the series regulator are connected in series to a load. This makes it possible to obtain a higher output voltage than an input voltage and vary output voltage in response to rapidly varying high-frequency command voltage. In addition, the power conversion efficiency is excellent.

According to other embodiment of the invention, the DC-DC converter has a configuration that the input of the series regulator and the input of the switched capacitor circuit are connected in parallel to a dc power supply, and that the outputs of the switched capacitor circuit and the series regulator are connected in series to a load. This permits a compact DC-DC converter which can provide a higher output voltage than an input voltage and vary output voltage in response to rapidly varying high-frequency command voltage.

What is claimed is:

1. A DC-DC converter connected between a dc power supply and a load, comprising:
   a first converter circuit which converts input voltage fed from said dc power supply according to a rapidly varying first command signal and generates a lower output voltage than said input voltage, said circuit having a pair of input terminals connected to said dc power supply and a pair of output terminals for outputting said output voltage; and
   at least one second converter circuit which receives input voltage from said dc power supply and generates a constant output voltage converted at a given ratio, said second converter circuit having a pair of input terminals connected to said dc power supply and a pair of output terminals for outputting said constant output voltage;
   said pairs of input terminals of said first and second converter circuits being connected in parallel to said dc power supply, and said output terminals of each circuit being connected in series to said load so that the sum of their output voltages is supplied to said load.

2. A DC-DC converter according to claim 1, wherein said second converter circuit includes an insulated switching power supply capable of stepping up or down said input voltage according to a second command signal, and said first converter circuit includes a series regulator whose input is provided with a filter for eliminating ripple voltage that is included in said input voltage fed from said dc power supply by influence of said switching power supply.

3. A DC-DC converter according to claim 2 wherein said insulated switching power supply capable of stepping up or down said input voltage is a forward converter.

4. A DC-DC converter according to claim 2 wherein said insulated switching power supply capable of stepping up or down said input volatage is a flyback converter.

5. A DC-DC converter according to claim 1 wherein said at least one second converter circuit includes at least one switched capacitor circuit for generating output voltage of almost the same voltage as that of said input voltage fed from said dc power supply, and said first converter circuit includes a series regulator whose input terminal is provided with a filter for eliminating ripple voltage that is includes in said input voltage from said dc power supply by influence of said swtiched capacitor circuit.

6. A DC-DC converter according to claim 1 wherein said at least one second converter circuit includes at least one switched capacitor circuit capable of stepping down said input voltage at a given ratio, and said first converter circuit includes a series regulator whose input terminal is provided with a filter for eliminating ripple voltage that is included in said input voltage from said dc power supply by the influence of said switched capacitor circuit.

7. A DC-DC converter according to claim 1, wherein the load is a saturation-type amplifier of a portable telephone set as a drain voltage control power supply for supplying drain voltage to an output-stage field effect transistor in said saturation-type amplifier for amplifying high-frequency power, thus implementing high-frequency power amplification based on a drain voltage control.

8. A DC-DC converter according to claim 1 further comprising:
means for detecting input voltage fed from said dc power supply and suspending the operation of said second converter circuit when said input voltage is higher than a given voltage to be supplied to said load.

* * * * *

UNITED STATES PATENT AND TRADEMARK OFFICE
CERTIFICATE OF CORRECTION

PATENT NO. :   5,267,136
DATED      :   November 30, 1993
INVENTOR(S) :  Ikuro Suga et al.

It is certified that error appears in the above-indentified patent and that said Letters Patent is hereby corrected as shown below:

Col. 12, line 51, "volatage" should be -- voltage --.

Signed and Sealed this

Second Day of August, 1994

Attest:

BRUCE LEHMAN

Attesting Officer        Commissioner of Patents and Trademarks